J. PICKARD.
HEDDLE.
APPLICATION FILED DEC. 23, 1909.
1,107,345.
Patented Aug. 18, 1914.
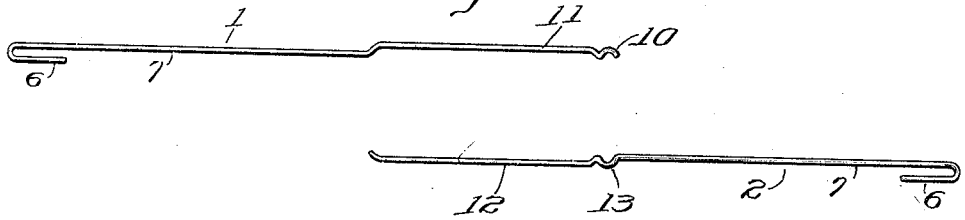
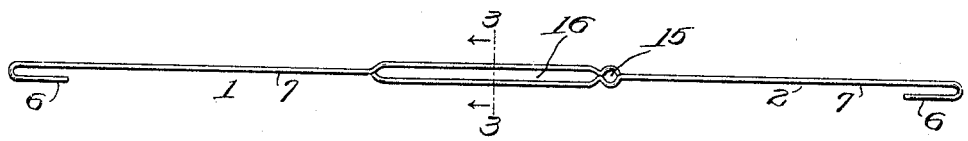
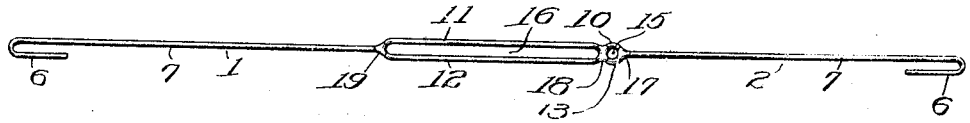
INVENTOR
Joseph Pickard.
WITNESSES
BY
ATTORNEY

UNITED STATES PATENT OFFICE.

JOSEPH PICKARD, OF PHILADELPHIA, PENNSYLVANIA.

HEDDLE.

1,107,345.

Specification of Letters Patent.

Patented Aug. 18, 1914.

Application filed December 23, 1909. Serial No. 534,566.

*To all whom it may concern:*

Be it known that I, JOSEPH PICKARD, a citizen of the United States, and a resident of the city of Philadelphia, State of Pennsylvania, have invented certain new and useful Improvements in Heddles, of which the following is a full, clear, and exact disclosure.

The main objects of this invention are, to provide an improved heddle of strong and durable construction, and one that will have a high degree of efficiency in operation; to simplify the construction of heddles; and to provide other improvements as will appear hereinafter.

In the accompanying drawings, Figure 1 is a side elevation of disconnected parts of a heddle constructed in accordance with this invention; Fig. 2 a side elevation of the same in position ready to be joined; Fig. 3 a transverse section on line 3—3 of Fig. 2; and Fig. 4 a side elevation of the parts of the heddle permanently joined and forming a completed article.

Referring to the drawings, one embodiment of this invention comprises a heddle consisting of two wires or elongated members 1 and 2, the inner portions of which are joined together by means of solder or by brazing or in any other suitable manner. These members 1 and 2 are preferably each formed from smooth cylindrical wire of spring steel, but this invention is not limited to any particular shape of wire nor to any particular material, as these members may be formed of any suitable material and may be of any suitable shape. The outer end of each of the members 1 and 2 is bent to form the usual loop or hook 6, and the main outer portion 7 of each of the members is substantially straight and extends longitudinally in alinement or coaxial with the main outer portion 7 of the other member. The inner portion of one of the members 1 and 2 terminates in a comparatively short substantially semi-circular bend or crimp 10, and adjacent this crimp the member is bent in the form of an elongated crimp 11. The inner portion of the other member terminates in an elongated crimp 12, equal in size and similar in shape to the elongated crimp 11 in the first mentioned member, and is bent adjacent this elongated crimp into a semi-circular crimp 13, equal in size to the semi-circular crimp 10, in the first mentioned member. When the two members 1 and 2 are in position to be joined, as shown in Fig. 2, the crimps 10, 11, 12 and 13 in the members are oppositely arranged and the semi-circular crimps 10 and 13 unite to form a comparatively small substantially circular eye 15, and the elongated crimps 11 and 12 unite to form an elongated eye 16, the two eyes 15 and 16 being arranged coaxially with the main outer portions 7 of the heddle.

The inner portions of the two members 1 and 2 are securely united by means of solder or by brazing or in any other suitable manner, but preferably by brazing, to form three spaced rigid joints or connections 17, 18 and 19, between the two members, each of two, 17 and 19, of these joints being in the form of a butt joint between the end of one member, and the adjacent portion of the other member, and the third joint, 18, being between the two eyes.

It has been discovered that when two wires are joined by brazing to form a heddle in accordance with this invention, the brazing material, under the action of heat and the force of molecular and capillary attraction, is concentrated at the two butt joints and at the intermediate joint, and upon cooling presents only smooth, rounded, solid masses, which do not require any further shaping or finishing to render the heddle ready for use, and which are arranged to complete most satisfactorily the contours of the eyes of the heddle, and to serve most effectively the double purpose of securing together the two overlapping members and providing antifriction bearings having smooth rounded surfaces arranged to guide the threads as the threads are drawn through the heddle.

This improved heddle is adapted to be used in looms for weaving carpets. In making Brussels or tapestry carpets, several warps of different materials are used. In utilizing this improved heddle in the manufacture of tapestry carpet, a thread of worsted warp extends through and is carried by the smaller eye of each heddle for making the top surface or face of the carpet, and a thread of a stuffer warp extends through the oblong or larger eye of each heddle. A third warp, known as a chain warp, is carried by a plurality of heddles, each having a single eye which alternate with the heddles having two eyes such as is herein disclosed. The double eyed heddles are arranged and reciprocated vertically and the threads of the worsted warp are moved vertically by the heddles, while the threads of the stuffer warp remain vertically stationary. The heddles are preferably arranged with the eye or eyes of each heddle in a plane oblique to the general direction of the thread or threads carried thereby, the heddles being ordinarily parallel and spaced closely together. It is, therefore, evident that the heddles should be free from all sharp or rough surfaces and particularly that the surfaces of the eyes should be rounded and free from sharp angles to avoid excessive wear on the threads and to avoid the collection of fine particles of the threads that might interfere with the operation of the heddles. It is also evident that the heddles should be strong and durable and be provided with eyes of sufficient size to permit the free passage of the threads, but at the same time it is evidently highly important to have no superfluous material in the heddles and to have the heddles so constructed as to occupy a minimum amount of space so that the heddles may be arranged very close together without interfering with each other in their operation.

It is evident that this invention provides an extremely simple device, which is free from the objectionable features found in many heddles heretofore constructed and which meets all of the requirements for the highest class of work.

Although only a single form has been shown in which this invention may be embodied, it is obvious that many changes might be made in the construction illustrated without departing from the spirit of this invention or the scope of the appended claims.

Having thus fully described this invention, I claim and desire to protect by Letters Patent of the United States:—

1. A heddle comprising two elongated members having crimped, overlapping inner portions joined by two spaced butt joints, one end of each of said portions being joined to the side of the other of said portions to form one of said joints.

2. A heddle, comprising two elongated members having crimped portions joined by two spaced butt joints and an intermediate lap joint to form two adjoining eyes.

3. A heddle, comprising two elongated members having crimped portions joined by two spaced butt joints and an intermediate lap joint to form two adjoining eyes, said crimped portions being arranged in the same plane.

4. A heddle, comprising two elongated members having crimped portions arranged to form two spaced butt joints, and an intermediate lap joint, forming two eyes, said crimped portions being arranged in the same plane, and said crimped portions being secured together at said joints by adhesive means.

5. A heddle, comprising two wires having overlapping inner portions substantially uniform in cross section throughout their lengths, the inner portion of one wire terminating in a comparatively short substantially semi-circular crimp, and said inner portion having an elongated crimp adjacent said short crimp, and the inner portion of the other wire terminating in an elongated crimp substantially similar and equal to said first mentioned elongated crimp, and said other wire having a comparatively short substantially semicircular crimp adjacent said second mentioned elongated crimp and substantially equal to said first mentioned semicircular crimp, the said short crimp and elongated crimp of one wire being substantially opposite to the short crimp and the elongated crimp respectively of the other wire, the inner end of each of said wires being arranged to form a butt joint with the side of the other wire, and said wires being arranged to form a lap joint between said short crimps and said elongated crimps, and adhesive means at said joints forming the sole means of connection between said wires and combining with said crimps to form a substantially circular eye and an elongated eye, the center of said circular eye, the longitudinal axis of the said elongated eye, and the longitudinal axes of the portions of said wires leading outwardly from said overlapping portions being substantially in the same straight line, and the said eyes being arranged substantially in the same plane.

6. A heddle comprising two elongated steel members having overlapping inner portions arranged to form two spaced butt joints and secured together at each of said joints by brazing, each of said portions being provided between said butt joints with a crimp, and the crimp of one of said portions being arranged to form in combination with the crimp of the other portion an eye.

7. A heddle comprising two elongated steel members having overlapping crimped inner portions arranged to form two spaced butt joints and an intermediate joint, to form two adjoining eyes, said portions being secured together at each of said joints by brazing.

In witness whereof I have hereunto set my hand this 20th day of December, 1909.

JOSEPH PICKARD.

Witnesses:
ADDISON IRWIN GARDNER,
ALEXANDER PARK.